United States Patent [19]

Sundberg

[11] 4,370,082
[45] Jan. 25, 1983

[54] FASTENING ELEMENT

[76] Inventor: Börje E. I. Sundberg, Frejgatan 19, S-113 49 Stockholm, Sweden

[21] Appl. No.: 327,481

[22] Filed: Dec. 4, 1981

Related U.S. Application Data

[63] Continuation of Ser. No. 82,166, Oct. 5, 1979, abandoned.

[30] Foreign Application Priority Data

Oct. 5, 1978 [SE] Sweden ............... 7810425

[51] Int. Cl.³ .......................................... F16B 13/06
[52] U.S. Cl. .......................................... 411/61; 248/71
[58] Field of Search ................. 411/61, 60, 62, 57, 411/44, 15; 248/71; 308/237 R, 237 A; 16/108, 109

[56] References Cited

U.S. PATENT DOCUMENTS

| 713,027 | 11/1902 | Weaver | 308/237 R |
|---|---|---|---|
| 728,144 | 5/1903 | Tribe | 411/61 |
| 987,229 | 3/1911 | Haywood | 411/57 |
| 1,434,806 | 11/1922 | Brown | 411/61 |
| 1,960,046 | 5/1934 | Beal | 411/60 |
| 2,240,425 | 4/1941 | Sternbergh | 411/432 X |
| 2,400,142 | 5/1946 | Tinnerman | 411/61 |
| 3,503,802 | 3/1970 | Galbato | 308/237 R X |

FOREIGN PATENT DOCUMENTS

| 320872 | 5/1920 | Fed. Rep. of Germany | 411/60 |
|---|---|---|---|
| 2145759 | 3/1973 | Fed. Rep. of Germany | 308/237 R |
| 2411146 | 9/1975 | Fed. Rep. of Germany | 411/44 |
| 855297 | 11/1960 | United Kingdom | 411/60 |

Primary Examiner—Ramon S. Britts
Attorney, Agent, or Firm—Hill, Van Santen, Steadman, Chiara & Simpson

[57] ABSTRACT

A fastening element to be used with a fastener, such as a screw, comprising a longitudinally slotted conical sleeve of an at least slightly resilient material, said sleeve being sized to be held by friction fit in a hole, wherein the screw is to be inserted.

3 Claims, 2 Drawing Figures

FASTENING ELEMENT

This is a continuation of application Ser. No. 082,166, filed Oct. 5, 1979, now abandoned.

BACKGROUND OF THE INVENTION

1. Field of the Invention

This invention relates to a fastening element, comprising an expandable sleeve to be used with a fastener, such as a screw.

2. Prior art

When mounting objects on walls or the like of hard materials, such as stone, brick, plaster, etc. the traditional way is to drill a comparatively deep hole into the wall, into which a plug of some kind, such as a wooden plug, a plastic plug or a plug of a fibrous material, is inserted. This plug may have a hole, or has a hole made therein, for a suitable screw which forms the actual fastener.

Surveys have shown that in the vast majority of cases the holes in the walls are drilled unnecessarily deep, and unnecessarily long plugs and fasteners are used for the purpose of achieving the intended holding force and resistance to withdrawal. This entails very high, unnecessary costs for labor and materials, and also for tools, since the drill bits are subjected to an unnecessary high wear. Another disadvantage is that the fastening assemblies so far used, comprising a long plug and a long screw or the like, generally undergo such a deformation on mounting that they cannot be removed and used again.

Fastening elements in the form of expandable sleeves have been proposed in the past. Thus, German AS 1 167 509 discloses an expandable sleeve made of a corrugated sheet metal strip. French specification 1 023 043 discloses an expandable sleeve made of a sheet metal strip which has been provided with a plurality of protrusions or embossments by stamping. Neither one of these prior art fastening elements functions satisfactorily. In particular, they do not expand satisfactorily, and they do not engage satisfactorily with the screws and with the internal hole surfaces to provide the required frictional engagement.

SUMMARY OF THE INVENTION

The fastening element according to the present invention comprises a longitudinally slotted conical sleeve of an at least slightly resilient material, which sleeve is dimensioned in such a manner that, upon insertion of the sleeve into the hole, the friction against the internal hole surface results in a holding force which exceeds the torque that the fastener causes as it is being driven into the sleeve.

For the fuller understanding of the invention, reference may be had to the following description of a preferred embodiment illustrated on the accompanying drawing.

ON THE DRAWING

AS SHOWN ON THE DRAWING

The fastener assembly according to the invention comprises a fastening element in the shape of an expandable sleeve 10. The sleeve is longitudinally slotted and conical, and made of an at least slightly resilient material, such as sheet metal, aluminum or a suitable plastic material. The conicity of the sleeve, expressed as the angle between the axial centerline of the sleeve and a generatrix along the outer surface of the sleeve, may be as small as 1–2° but amounts preferably to 10–20°, such as 15°, for example. The axial length of the sleeve 10 is adapted to the requirements in each application and normally the sleeves 10 will be manufactured in lengths of 5,10,15,20 and 30 mm. The wall thickness will be chosen with due respect paid to the expected stresses, the conicity and the desired resiliency as well as, of course, the choice of material. At all events, the sleeve 10 should be designed in such a manner that it does not immediately collapse when a screw, for example, is screwed into it but then, through engagement with the threads of the screw, is forced outwards to press against the sides of the hole with high friction. At the same time, however, the resiliency of the sleeve shall be sufficient to ensure that, on unscrewing the screw, the sleeve regains substantially its original shape and loses its frictional engagement with the hole surface, to permit the sleeve to be removed and be used again together with the screw in question.

Figure 1:
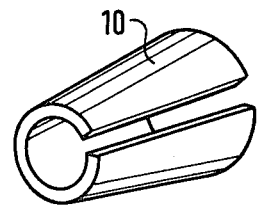
FIG. 1 shows a schematic perspective view of an expandable sleeve.
Figure 2:
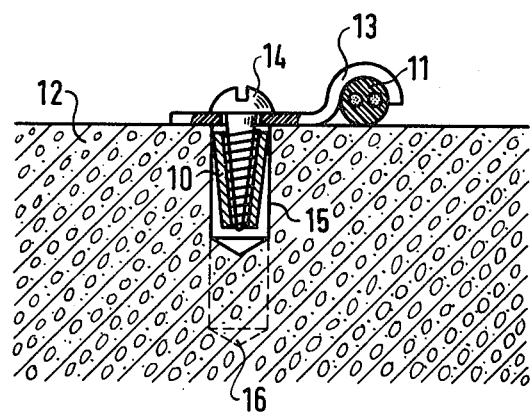
FIG. 2 shows a cross-section through a wall on which an electric cable or the like has been clamped by means of a fastener assembly according to the present invention.

FIG. 2 shows the fastening assembly according to the invention used for clamping or mounting an electric cable 11, for example, on a wall 12 by means of ordinary cable clips 13. In this case the fastening assembly comprises, in addition to the sleeve 10, an ordinary wood screw 14 which, however, is very much shorter than would otherwise be considered to be necessary. Consequently, the drilled hole 15 is much shallower than would normally be considered necessary, as is indicated by broken lines for a drilled hole 16.

A plurality of modifications and alterations as to details may be carried out within the scope of the inventive idea.

I claim as my invention:

1. A fastening element for use with a tapered screw, comprising a longitudinally slotted conical sleeve of an at least slightly resilient sheet metal of uniform thickness, said sleeve having smooth interior and exterior tapered surfaces of linear circular cross-section, the slot being an arcuate portion of the circular cross-section of said sleeve and being of substantially constant width throughout its length, said slot further extending throughout the axial extent of said sleeve, the taper of said surfaces being uniform throughout their axial extent, and being complemental in relation to the outside diameter of the screw, whereby upon insertion of said sleeve into a hole and the screw into said sleeve, the friction against the internal hole surface effects a holding force which exceeds the torque that the screw causes as it is being driven into said sleeve, the conicity of the tapered sleeve being in the range of 14 to 16 degrees, namely the same conicity as the average conicity of the screw.

2. A fastening element as claimed in claim 1, said sheet metal being one of brass or aluminum.

3. A fastening element as claimed in claim 1, both of said interior and exterior tapered surfaces having the axially outermost ends of said sleeve.

* * * * *